United States Patent [19]
Mote

[11] Patent Number: 5,908,279
[45] Date of Patent: Jun. 1, 1999

[54] MOTORIZED TRAILER FOR DELIVERY AND INSTALLATION OF PROPANE TANKS

[76] Inventor: Preston P. Mote, 11591 W. State Rte. 571, Laura, Ohio 45337

[21] Appl. No.: 08/910,035

[22] Filed: Aug. 12, 1997

[51] Int. Cl.$^6$ ...................................................... B60P 1/54
[52] U.S. Cl. ............................................................. 414/542
[58] Field of Search ................................... 414/540–543; 280/765.1

[56] References Cited

U.S. PATENT DOCUMENTS

| | | | |
|---|---|---|---|
| 2,915,206 | 12/1959 | Doswell | 414/542 |
| 3,024,925 | 3/1962 | Werner et al. | 414/543 |
| 3,306,467 | 2/1967 | Weempe | 414/541 |
| 3,768,670 | 10/1973 | Cloud | 414/543 |
| 3,863,782 | 2/1975 | Sandrock | 414/542 |
| 4,589,632 | 5/1986 | Smith | 280/765.1 X |
| 4,858,855 | 8/1989 | Dalbera | 414/542 X |
| 5,718,555 | 2/1998 | Swalheim | 414/542 X |
| 5,743,702 | 4/1998 | Gunderson | 414/542 |
| 5,769,586 | 6/1998 | Schulte | 414/542 X |
| 5,800,117 | 9/1998 | Milton | 414/540 |

FOREIGN PATENT DOCUMENTS

| | | | |
|---|---|---|---|
| 2306358 | 8/1974 | Germany | 414/542 |
| 1627433 | 2/1991 | U.S.S.R. | 280/765.1 |
| 2135974 | 9/1984 | United Kingdom | 414/542 |

*Primary Examiner*—David A. Bucci
*Attorney, Agent, or Firm*—William Weigl

[57] ABSTRACT

A towable-trailer for a propane tank has a frame which is provided with an overhead boom extending lengthwise of the trailer and beyond the back of the trailer, a tank hoist movable along the boom, an independent engine and power train with a universal for driving the trailer wheels, and a steering mechanism for a retractable nose wheel of the trailer, with the engine being located at the trailer hitch end for proper weight distribution to offset the weight of a tank when positioned at the rear end of the boom. The trailer can be independently driven into a confined new-tank storage yard to pick up a tank, the loaded trailer driven to a purging station to have the tank purged, the trailer hitched to a truck, hauled to the site and unhitched from the truck at the road, the trailer independently driven to the point of final installation and the tank deposited at the point, all of these tasks ordinarily being handled by the same individual without assistance.

2 Claims, 1 Drawing Sheet

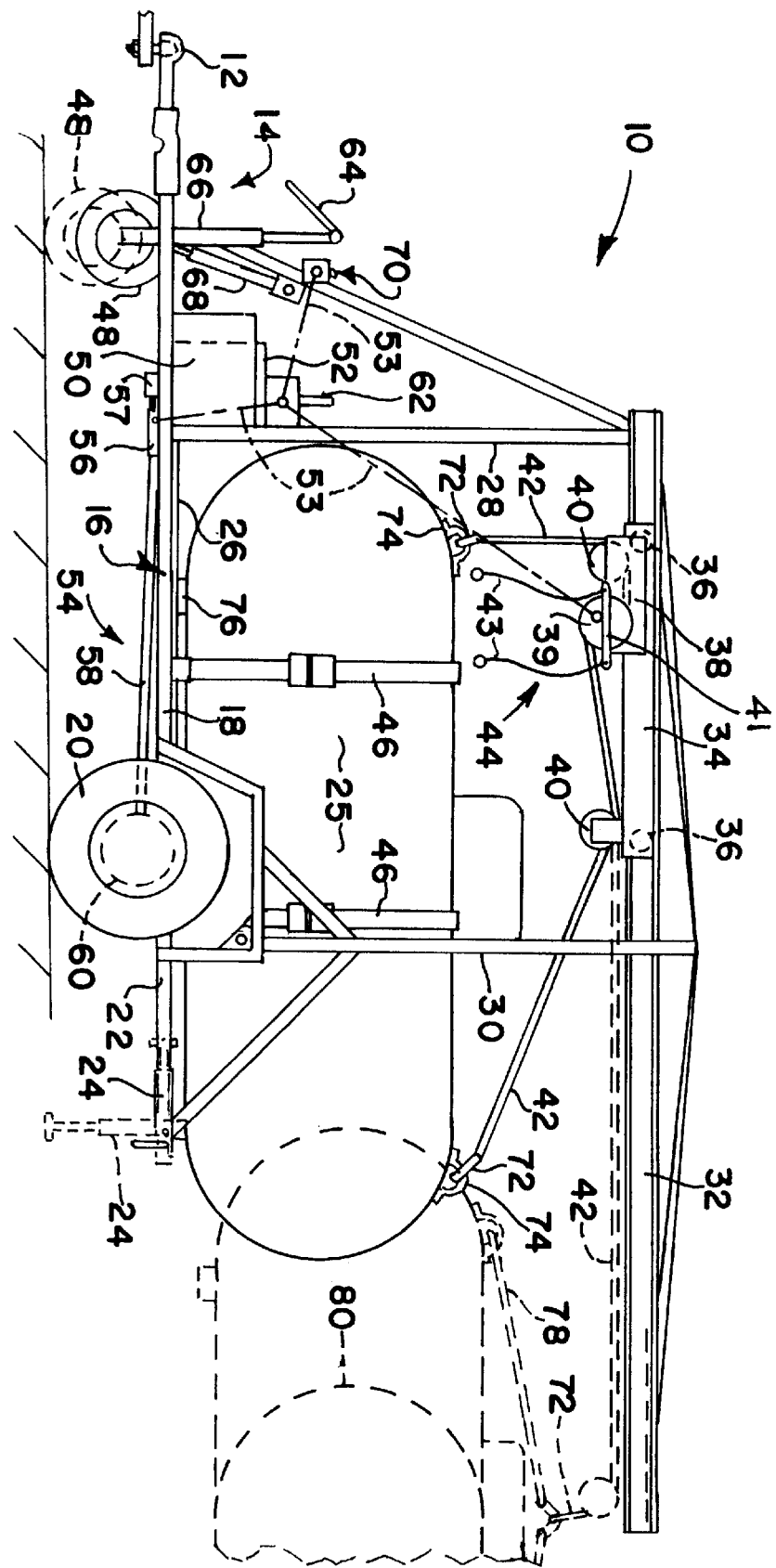

MOTORIZED TRAILER FOR DELIVERY AND INSTALLATION OF PROPANE TANKS

This invention relates to a vehicle-towable trailer which is capable of being unhitched from the vehicle and independently driven to an installation point at a residence or business without necessitating that a propane tank be towed or backed there by the vehicle. It further relates to structure which facilitates simple and rapid pick-up, delivery and installation of such a tank at considerably less expense than heretofore. This application is based on U.S. Provisional patent application Ser. No. 60/031,522, filed Nov. 29, 1996.

BACKGROUND OF THE INVENTION

Present day installation of a new LPG (liquid petroleum gas) tank, which may range in capacity from 100 to 500 gallons and weigh between 355 and 1980 pounds, typically requires that it be towed with a trailer to the site by a truck and backed (if that is possible) into the final installation position. The towing truck must frequently have a four-wheel drive to enable its being driven over soft earth at the site. Added to the tank weight is a propane fill of approximately 10% of the tank capacity, which is accomplished during required purging noted below. Often-times, because of shrubbery, trees and plants and because of the placement in a backyard, the trailer must be unhitched well short of the final location and pushed or pulled by hand the remaining distance. If impossible to move the trailer directly to the final position, the tank must be unloaded and dragged there by hand.

When it is possible to back a truck to very near the installation point, it must be driven there by the truck and the trailer maintained hitched to the truck during unloading of the tank. For at least 60 years, the industry standard trailer has had a U-shaped frame, with the base of the U being adjacent the trailer hitch. The trailer was backed over an empty tank, the frame straddling the tank as the trailer was moved over it. A fixed-position overhead hoist then lifted the tank above the frame, cross supports were positioned below the tank and connected to legs of the U-shaped frame, and the tank was lowered to the cross supports and strapped to the frame for delivery. The empty tank was then taken or transported by the truck and trailer to a purging station where factory-installed compressed test air has to first be evacuated by purging the tank with propane vapor and alcohol. Approximately ten percent of the tank is then filled with LPG. State laws typically limit tank transportation over the road to no more than that amount in the portable tank. The vehicle and partially-filled suspended tank was then driven to the site, backed as close as possible to the point of installation and the pick-up process was reversed to lower the tank to the ground between the U frame. This often meant driving the truck and trailer across a lawn, often causing some lawn damage. The tank was manually moved the remaining distance, this oftentimes being the most physically strenuous part of the entire process. The entire procedure just described ordinarily ties up the time of two persons from initial tank pick-up to final installation. One variation of the above U-shaped trailer has a cantilevered boom extending rearwardly beyond the end of the trailer. The trailer is first backed while remaining hitched to the truck as close to the installation site as possible. If the trailer could be aligned with the final position of the tank, it could merely be lowered between the legs of the U. If, however, the tank had to be finally located at right angles to the position to which it could be driven by the truck, the tank was first lowered to the ground between the legs of the U and disconnected from the hoist, the truck and trailer driven forward until the distal end of the boom was directly over the center of the tank, and the tank then raised again, turned 90 degrees to the trailer, and lowered again to its final position. To accommodate this final move, the front hoist cable or chain would have to be removed from the front end of the tank, a separate spreader chain or cable connected between the ends of the tank, and the rear cable extended to a pulley at the end of the boom and connected to the center of the spreader chain. The tank could then be lifted again, turned 90 degrees about the rear hoist cable, and lowered to the ground. While this was done, the trailer had to remain hitched to the truck because the weight of the cantilevered tank suspended at the far end of the boom would tend to raise the hitch end of the trailer. As such, the truck, often necessarily a four-wheeled drive vehicle, had to keep the trailer hitched the entire time.

Another means of tank delivery requires two or more persons to normally mount a first pair of wheels under one end of the tank and drive wheels under the opposite end, drive the combined unit to a purging station with the tank itself serving as a chassis between the independent front and rear wheels, drive the unit onto a trailer bed by means of a ramp at the back of the trailer, tow the trailer to the installation site and park it on the road or in a driveway, drive the unit off the ramp, and then drive the unit from the road to the final resting position. To the best of my knowledge, this latter tank delivery system is the only one which enables the tank to be removed from a trailer at the road and driven to the final installation point. Nevertheless, I believe it to be necessary to employ two persons both to mount the tank onto its front and rear wheels at the outset and to remove the sets of wheels just before final installation. This essentially ties up two employees throughout the entire process, adding to the overall cost burden which includes the drive time of two people from the yard to the site and back. The manufacturer of this system also uses a special motorized cart onto which a smaller upright tank can be lifted and similarly delivered to the site. Here the tank is cargo only, and not part of the driven structure.

Use of independently-driven motorized trailers in fields other than propane tank delivery has been known for a considerable period of time, but that knowledge has not been applied to the propane industry. For example, such trailers have been used for delivering concrete burial vaults to cemeteries to avoid driving trucks over and around graves and depositing the vaults off the back end of the trailers into graves prepared in the ground. Because such vaults may weigh as much as 3000 pounds, a telescoping boom had to be used to extend well beyond the end of the trailer in order to straddle the grave. The telescoping end had a pair of legs mounted to the trailer during transporting of the vault by truck to the cemetary. The trailer was unhitched, powered by itself to one end or side of the grave, the heavy legs and boom extension detached by two persons from the trailer and manually lifted and carried to a position beyond the grave and firmly planted on secure earth at the far end of the grave. Whatever the reason, this readily-available, long-used design was never used in the propane tank industry, possibly because it was manual labor intensive in extending and returning the legs and perhaps also because it was unsuitable without extensive modification and redesign in order to accommodate it to the needs of the LPG industry.

SUMMARY OF THE INVENTION

A towable-trailer for a propane tank has a frame which is provided with an overhead boom extending lengthwise of the trailer and beyond the back of the trailer, a tank hoist movable along the boom, an independent engine and power train with a drive shaft for the trailer wheels, and a steering mechanism for a retractable nose wheel of the trailer, with the engine being located at the trailer hitch end for proper weight distribution to offset the weight of a tank when positioned at the rear end of the boom. The trailer can be independently driven into a confined new-tank storage yard to pick up a tank, the loaded trailer driven to a purging station to have the tank purged, the trailer hitched to a truck, towed to the site and unhitched from the truck at the road, the trailer independently driven to the point of final installation and the tank deposited at the point, all of these tasks ordinarily being handled by the same individual, without assistance. Frame extensions are provided at the back side ends of the trailer, with the extensions each being provided with an adjustable jack for leveling and helping maintain the rear of the trailer level when a tank is picked up or dropped off the cantilevered end of the boom. These jacks, along with the weight of the engine at the hitch end and the drive train being located between the wheels and the forward end of the trailer assist in offsetting the weight of the tank being picked up or lowered at the distal end of the boom.

A principal object of the invention is to be less labor-intensive, and therefore less costly, while enabling efficient delivery of propane tanks from the distributor to an installation site.

Another object is to enable use of a two-wheel drive vehicle to tow a trailer carrying an LPG tank to an installation site, and enable the vehicle driver to park remote from the final site and deliver the tank to and install it in the site, all by himself or herself.

Other objects will become apparent from the following description, in which reference is made to the accompanying drawing.

DESCRIPTION OF THE DRAWINGS

The sole drawing figure is a simplified left side elevational view of the trailer, with an LPG tank shown in solid lines while it is being towed by a truck to the installation location, and in dotted lines while a tank is being picked up by or lowered from a boom extension at the rear end of the trailer.

DESCRIPTION OF THE PREFERRED EMBODIMENT

In the drawing, a trailer 10 is illustrated as being detached from a truck (not shown), to which it is normally connected by a female portion 12 of a hitch mechanism at the front end or tongue 14 of the trailer. Connected to the tongue is a horizontal frame 16 made of rectangular box tubing. The frame comprises a pair of longitudinal box tubing sides 18 between which at a right angle are a plurality of like cross members (not shown), one of which is just to the right of a pair of tired wheels and forms the back end of the frame 16. The sides 18 extend rearwardly of the trailer back end in cantilevered fashion to provide jack extensions 22 at the end of each of which is an adjustable jack 24. The jacks may be of either the mechanical or hydraulic type. The two jacks, when a tank 25 is to be loaded onto or unloaded from a flat bed 26, are swiveled from their full line positions parallel and locked to the extensions 22 to their dotted-line positions at right angles to the extensions.

As is customary, the jacks can be manually cranked to allow for their vertical adjustment to raise or lower the back end of the trailer. The bed 26 is welded to the top side of the trailer frame 16 between a front standard 28 and a rear standard 30, the latter of which is in the form of an inverted U extending upwardly from the box tubing sides 18. The standards 28 and 30 have welded thereto an I-beam boom 32 which is suspended approximately half of its length rearwardly beyond the standard 30. The "I" of the boom stands vertically, suspended from the underside of the base of the inverted U of the standard 30. This is to allow for suspension and free horizontal traverse of a carriage 34 on rollers 36 from its full to its dotted line positions along boom 32. The carriage 34 has fastened thereto a motor support 38 and hydraulic motor 39, and together with a pair of pulleys 40 and a pair of cables 42, they comprise a hoist mechanism 44. The motor 39 is operated in conventional fashion from a neutral "off" position in opposite directions through a reversing lever 41, at the ends of which are suspended a pair of control ropes 43. The cables 42 are in a slightly slack condition in solid lines, since the trailer is shown in its position when being towed by a truck with the tank 25 strapped to the bed 26 by means of a pair of adjustable straps 46. At the rear of the bed and aligned with the center of the trailer is a cradle (not shown) for nesting and centering the tank when it is in strapped condition.

When detached from the towing vehicle, the front end of the trailer is supported on a nose wheel 48, extended to its dotted line position. It is shown in full lines in a retracted, road-hauling position, approximately eight inches off the road. The position of the nose wheel relative to the frame 16 is variable, to accommodate lifting the front of the trailer from the towing hitch, leveling the unit prior to unloading the tank and raising or lowering the front end of the frame when driving the trailer up or down slopes to and from the installation site. When the nose wheel 48 and jacks 24 are down and in their dotted line positions to support the trailer independently of the truck, the entire support for the trailer 10 is a five point suspension between the two wheels 20, the nose wheel 48 and the two jacks 24. Assuming the trailer is so supported and a tank is to be mounted on the bed 26 for delivery to an installation location, one person can first take the trailer to a tank storage yard by driving it there to pick Up a tank 25. This is done by starting a conventional gasoline engine 50 which provides hydraulic pressure through a hydraulic unit 52 and a drive to the wheels 20 through a power train 54 consisting of a rotary hydraulic motor 56, a two speed transmission having a neutral 57, a drive shaft 58 and a conventional differential mechanism 60 to a pair of shafts connected to the wheels 20. The drive is kept in neutral during road towing. Control of driving is through a forward/reverse lever 62 which is operatively connected to drive motor 54 in corresponding directions as desired. For purposes of simplicity, the hydraulic unit connections to the various hydraulically-operated elements are shown as dot-dash lines 53. Such a line 53 would also extend to the jacks 24 if they are designed for hydraulic actuation. All of the hydraulic components are off-the-shelf items which are well known in the industry and need not be described in detail here.

Steering control is provided through a tiller 64 which pivots the nose wheel 48 about a vertical shaft 66. The shaft 66 telescopes under operation of a swivel-mounted hydraulic cylinder 68 to raise and lower the nose wheel 48. Its control is through a valve and lever 70. By starting the engine 50 to create hydraulic pressure for driving the wheels 20, an operator can stand alongside the tongue 14, and through manipulation of the tiller 64 and lever 62 with two hands, drive the trailer 10 directly up to a tank standing on the ground. He can then attach cable hooks 72 into eyes 74 permanently affixed to the upper ends of the tank 25, lift the tank with the hoist mechanism 44 positioned at the distal end of the boom 32 to a height above the level of the bed 26, push the tank and thereby roll the carriage 34 and tank leftwardly and lower the tank with the hoist onto the bed 26. The tank has legs 76 which support the tank above the bed. The tank is tied to the bed by the straps 46, and the hoist motor takes the slack out of the cables 42 to stabilize the carriage 34 during road transport.

After the tank has been securely strapped for hauling, the trailer is driven to a purging station in the storage yard or nearby. Tanks are pressure-tested with compressed air at manufacture and that compressed air is maintained in the tank during storage, until ready for installation. At that time, the air is discharged, and two to four quarts of alcohol, depending on tank capacity, is put into the tank. The propane tank is then filled to twenty pounds of vapor pressure four times. The tank is then filled with liquid propane to about ten percent of its capacity. Upon completion of purging, the trailer can be driven to a truck or vice versa for hitching up and hauling the tank to its final destination. The nose wheel can be hydraulically operated to lower the trailer tongue gently onto the vehicle ball hitch. Once hitched, the nose wheel is lifted via cylinder 68. The jacks 24 are or would have been previously swung and fastened in their horizontal road-travelling position.

Upon arrival at the site, the nose wheel is used to lift the front end of the trailer from the truck portion of the hitch with the truck being left at the road or in a driveway. This avoids travelling over the customer's lawn, and for newly-built homes which may have soft ground or mud around them, avoids the risk of the truck or four-wheel drive vehicle getting bogged down or stuck. The trailer can be driven independently as before by starting the engine to create hydraulic pressure, manipulating the lever 62 and tiller to move the trailer to the final installation point of the tank 25, and position the distal end of the boom 32 directly over the final position of the tank. The trailer is leveled, the tank 25 unstrapped, the tank hoisted clear of the bed 26, the carriage and tank moved to the back end of the boom 32 and the tank lowered to its final position, usually being placed on supporting blocks. If, because the tank must be finally positioned at a right angle to the trailer, it is first lowered to the ground, the hoist hooks 72 removed and a spreader chain or cable 78 attached between the eyes 74. The rear cable 42 is then connected by itself to the center of the spreader chain 78, the tank raised again by just the rear cable, pivoted 90 degrees about the rear cable until it turns to the dotted-line position 80 and is finally relowered to the installation point.

This is all possible because the location of most weight of the trailer is at the hitch end of the trailer, The engine 50, hydraulic unit 52 and drive train are all forward of the wheels 20. Additional support to offset the heavy weight of a tank loaded with 10 percent LPG is provided by the jacks 24, which extend sufficiently rear-wardly beyond the trailer 10 to provide firm stabilization to the trailer during loading and loading.

Various changes may be made without departing from the spirit and scope of the invention.

Having described my invention, I claim:

1. A vehicle-towable trailer having a frame, a bed, a forward hitch end connectable with a vehicle for towing the trailer, a power train including a drive shaft, a differential, a pair of aligned axles driven through said differential and each having a wheel at its end remote from the differential, an open back end of said trailer remote from said hitch end at which a partially filled horizontally-elongated liquid propane tank may be loaded onto and unloaded from said trailer, said tank having cable-connecting eves at opposite upper ends thereof, said frame including a fixed overhead boom forming a track extending horizontally from adjacent said hitch end to a cantilevered distal end extending beyond said back end, a horizontally-elongated carriage mounted for horizontal movement along said track, a hoist mechanism mounted on said carriage and movable therewith along said track between its ends, said hoist mechanism including a pair of horizontally-spaced pulleys and a cable trained over each said pulley, said cables having means for connecting extended ends thereof to said cable-connecting eyes of said tank, a reel for said cables and a hydraulically-operated control for rotating said reel to selectively simultaneously retract and extend said cables, a hydraulically-operated pump mounted on said frame adjacent said hitch end, an independent motive means for driving said power train and operating said pump to create hydraulic pressure, said motive means including means for selectively driving said wheels in either a forward or reverse direction, and said motive means further being mounted adjacent said hitch end forward of said wheels, a vertically-adjustable nose wheel including a steering tiller mounted to said frame adjacent said hitch end, hydraulic means interconnected to said pump for moving said nose wheel between an inactive retracted position above a road surface during towing by a vehicle and an active position contacting a ground or road surface to support said trailer essentially level on said nose wheel and said pair of wheels, whereby said trailer may be disconnected from said vehicle upon reaching a site for tank installation and independently steered and driven to a final tank location for depositing the tank from the distal end of the boom.

2. The trailer of claim 1 further including said trailer bed being flat and means on said bed for strapping a tank to the bed during over the road delivery by the vehicle.

* * * * *